(12) United States Patent
Pomme

(10) Patent No.: US 9,623,723 B2
(45) Date of Patent: Apr. 18, 2017

(54) SYSTEM FOR HEATING THE CABIN OF AN AIRCRAFT PROVIDED WITH AN ANNULAR HEAT EXCHANGER AROUND THE EXHAUST NOZZLE

(71) Applicant: AIRBUS HELICOPTERS, Marignane (FR)

(72) Inventor: Vincent Pomme, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 422 days.

(21) Appl. No.: 14/302,578

(22) Filed: Jun. 12, 2014

(65) Prior Publication Data

US 2014/0367476 A1    Dec. 18, 2014

(30) Foreign Application Priority Data

Jun. 18, 2013 (FR) ...................... 13 01413

(51) Int. Cl.
*B60H 1/20* (2006.01)
*B60H 1/18* (2006.01)
(Continued)

(52) U.S. Cl.
CPC ............... *B60H 1/18* (2013.01); *B64D 13/08* (2013.01); *F28D 7/0016* (2013.01);
(Continued)

(58) Field of Classification Search
CPC ........ B60H 1/20; B60H 1/18; B60H 1/00007; B60H 1/02; B64D 13/08; B64D 13/0611;
(Continued)

(56) References Cited

U.S. PATENT DOCUMENTS 1,427,475 A * 8/1922 Ishimatsu ................ B60H 1/20
237/12.3 A
1,471,312 A * 10/1923 Pelton ...................... B60H 1/18
237/12.3 A
(Continued)

FOREIGN PATENT DOCUMENTS

EP        0131508        1/1985

OTHER PUBLICATIONS

French Search Report for FR 1301413, Completed by the French Patent Office on Feb. 14, 2014, 6 Pages.

*Primary Examiner* — Gregory Huson
*Assistant Examiner* — Daniel E Namay
(74) *Attorney, Agent, or Firm* — Brooks Kushman P.C.

(57) ABSTRACT

A heating system (50) for heating a cabin (2) of an aircraft (1), said heating system including an annular heat exchanger (10) positioned around an exhaust pipe (21) of a turbine engine (20), and through which a heat transfer fluid (14) and ambient air (25) flow. Said heat exchanger (10) is provided with a rear casing situated at an outlet of said heat exchanger (10) and directing the ambient air (25) exiting form said heat exchanger (10) towards said exhaust gas (15) exiting via said exhaust pipe (21). Said exhaust gas (15) then generates a flow of ambient air (25) through said heat exchanger (10) by the "Coanda" effect. Said ambient air (25) flowing through said heat exchanger (10) is thus heated by convection from said pipe (21), and said heat transfer fluid (14) is heated firstly by radiation from said pipe (21) and secondly by convection between said heat transfer fluid (14) and said ambient air (25).

14 Claims, 1 Drawing Sheet

(51) Int. Cl.
  *B64D 13/08* (2006.01)
  *F28F 13/06* (2006.01)
  *F28D 7/00* (2006.01)
  *B64D 33/10* (2006.01)
  *F28D 7/10* (2006.01)
  *F28D 21/00* (2006.01)
  *F28D 1/04* (2006.01)

(52) U.S. Cl.
  CPC ....... *F28D 7/0066* (2013.01); *F28D 21/0003* (2013.01); *F28F 13/06* (2013.01); *F28D 1/0461* (2013.01); *F28D 2021/0021* (2013.01); *F28F 2265/10* (2013.01)

(58) Field of Classification Search
  CPC ..... B64D 33/10; F28D 7/0016; F28D 7/0066; F28D 7/0025; F28D 21/0003; F28D 1/0461; F28D 2021/0021; F28D 3/02; F28D 7/10; F28F 13/06; F28F 2265/10; F24H 1/009; B64F 1/362
  USPC ..... 237/12.3 B, 12.3 A, 45, 34; 165/41, 177, 165/910, 134.1; 244/7 A, 118.5
  See application file for complete search history.

(56) References Cited

U.S. PATENT DOCUMENTS

| | | | | |
|---|---|---|---|---|
| 1,755,924 A * | 4/1930 | Keagle | ...................... | F01N 5/00 165/51 |
| 1,853,585 A * | 4/1932 | Sutter | ...................... | B60H 1/18 165/137 |
| 2,028,260 A * | 1/1936 | Vernet | ...................... | B60H 1/20 165/104.21 |
| 2,050,240 A * | 8/1936 | Beard | ...................... | B64D 13/08 237/12.3 B |
| 2,065,720 A * | 12/1936 | Morneautt | ............... | B60H 1/20 165/85 |
| 2,341,549 A | 2/1944 | Helmick | | |
| 2,383,640 A * | 8/1945 | Findley | ................ | B60H 1/0045 237/12.3 B |
| 2,611,585 A * | 9/1952 | Boling | .................. | F16L 53/002 165/154 |
| 3,971,511 A | 7/1976 | Casey | | |
| 4,289,197 A * | 9/1981 | McNamara | ............... | F28D 3/02 165/115 |
| 4,319,630 A | 3/1982 | Hronek et al. | | |
| 4,490,989 A | 1/1985 | Keen | | |
| 4,657,071 A | 4/1987 | Arene et al. | | |
| 5,249,623 A * | 10/1993 | Muller | ................... | B01D 35/18 165/156 |
| 5,690,168 A * | 11/1997 | Cizmar | .................. | C10G 9/002 165/134.1 |
| 6,568,203 B1 | 5/2003 | Leathers | | |
| 8,215,380 B2 * | 7/2012 | Li | ........................ | F28D 7/0016 165/172 |
| 2007/0295824 A1* | 12/2007 | Bradley | .................... | B60H 1/18 237/12.3 A |
| 2011/0308778 A1* | 12/2011 | Tsuda | ..................... | F02M 26/32 165/157 |
| 2012/0144814 A1* | 6/2012 | Won | ....................... | F01M 5/001 60/320 |
| 2012/0222845 A1* | 9/2012 | Kinder | .................... | F28F 13/12 165/154 |
| 2015/0114611 A1* | 4/2015 | Morris | ..................... | F02C 7/10 165/166 |
| 2015/0192367 A1* | 7/2015 | Davidovits | ........... | F28D 7/0008 165/135 |

* cited by examiner

SYSTEM FOR HEATING THE CABIN OF AN AIRCRAFT PROVIDED WITH AN ANNULAR HEAT EXCHANGER AROUND THE EXHAUST NOZZLE

CROSS REFERENCE TO RELATED APPLICATION

This application claims priority to French patent application No. FR 13 01413 filed on Jun. 18, 2013, the disclosure of which is incorporated in its entirety by reference herein.

BACKGROUND OF THE INVENTION (1) Field of the Invention

The present invention relates to the field of systems for heating the cabin of a vehicle. The present invention relates to a system for heating the cabin of a vehicle provided with an annular heat exchanger situated around an exhaust pipe, and it also relates to such an annular heat exchanger positioned around an exhaust pipe. The invention is particularly applicable to heating the cabin of a rotary-wing aircraft.

(2) Description of Related Art

It is known that a fraction of the heat generated by at least one engine of a vehicle can be used to heat the cabin of the vehicle.

For example, in automobiles, the majority of the engines in current use are liquid-cooled. The heat transmitted by the engine to the cooling liquid can then be used through a heat exchanger to heat the air taken into the cabin of the vehicle.

However, that technique is rarely used in aviation. Aircraft are often powered by turbine engines that do not have cooling systems using cooling liquid. Other techniques for heating the cabin have therefore been developed for aircraft.

The cabins of airplanes that fly at high altitude are generally pressurized. The difference in pressure between the outside air and the inside air can then be used to drive air circulation, e.g. via a turbine driven by said difference in pressure. That air can then be heated or cooled to regulate the temperature of the cabin of such an airplane.

However, such a solution is not applicable to aircraft having cabins that are not pressurized, such as the majority of rotary-wing aircraft. In such an aircraft, it is possible to use the compressed air for feeding the combustion chamber of the engine of the aircraft, and more particularly of a turbine engine. That compressed air has a temperature that is generally about 350 degrees Celsius (350° C.) at the compressor outlet. It is then possible to tap a fraction of that compressed air and to mix it with the outside air in order to heat the cabin of the aircraft. In addition, using that compressed air also procures excellent circulation for the heated air mixture inside the cabin of the aircraft.

That technique is the technique that is currently in the most widespread use in rotary-wing aircraft such as helicopters, but, unfortunately, it suffers from drawbacks.

Firstly, that technique is recognized as being a source of noise for the cabin of the aircraft, that noise mainly being due to the whistling generated by the compressed air expanding on being taken into the cabin.

In addition, that compressed air exits from the compressor at a high temperature, of about 350° C., as indicated above, and, in general, flows through ducts along the fuselage of the aircraft. Any rupturing of those ducts can then have serious consequences. Particularly severe safety measures are taken for such ducts and they are equipped with leak detection alarms.

Finally, tapping compressed air at the outlet of the compressor of an engine generates loss of efficiency for the engine and therefore a reduction in its power.

The exhaust gas from the engine of such an aircraft is removed at a very high temperature, of the order of 700° C., and can therefore also be a source of heat for heating the cabin of the aircraft.

For example, known Document U.S. Pat. No. 2,341,549 describes a system for heating the cabin of a vehicle. That system has a first pipe through which the cabin air circulates and which passes through the exhaust pipe of a turbine engine of that vehicle. However, in order to remove the risk of exhaust gas propagating into the cabin in the event of the first pipe leaking, that first pipe is situated inside an intermediate pipe through which a fluid flows, that intermediate pipe being in contact with the exhaust gas. The exhaust gas heats the fluid in the intermediate pipe, which fluid then heats the air for the cabin of the vehicle.

In addition, Document U.S. Pat. No. 3,971,511 describes a system for heating the cabin of an aircraft. An air-heating chamber is positioned at the engine of that aircraft and surrounds portions of the exhaust pipes of that engine. The air inside that heating chamber is then heated via the exhaust pipes through which the exhaust gas from the engine flows, and it is then guided towards the cabin via dedicated tubular pipes, while optionally also being mixed with air from the outside. The cabin can thus be heated by that air.

In addition, Document U.S. Pat. No. 4,490,989 discloses an air-conditioning and heating system for the cabin of a helicopter. The cabin is heated by the air circulating along a pipe passing through an air-heating chamber positioned at the engine of that aircraft and surrounding portions of the exhaust pipes of that engine.

Document U.S. Pat. No. 6,568,203 describes a system of supplying temperature-controlled air for an aircraft. That system makes it possible to cool compressed air by passing cooling air through a heat exchanger.

Document U.S. Pat. No. 4,319,630 is also known. That document describes a heat exchanger comprising two sets of U-shaped tubes. The U-shaped tubes of each set point in opposite directions and the two sets face each other. Two fluids flow independently in that heat exchanger, a respective one of the fluids flowing through the tubes of each set. Thus, heat exchange can take place between those two fluids.

Finally, Document EP 0 131 508 describes a column heat exchanger having vertical tubes. Heat exchange is then possible between a first fluid flowing around the vertical tubes and a second fluid flowing inside those tubes. That heat exchanger also has an auxiliary cooling device formed by one or more sheaths surrounding portions of the vertical tubes, it being possible for the first fluid to flow around those sheaths.

However, such heating systems use a heat exchanger for causing the air injected into the cabin to be heated by means of the exhaust gas. Such a heat exchanger is generally of non-negligible weight and volume, which can degrade the performance of the aircraft.

In addition, the exhaust gas exits from the combustion chamber of the engine at high speed, and it can suffer considerable head loss while flowing through the heat exchanger, which then gives rise to loss of power of the engine.

BRIEF SUMMARY OF THE INVENTION

An object of the present invention is thus to propose a heat exchange arrangement designed in particular for a heating system for an aircraft, which arrangement does not suffer from the above-mentioned limitations, and, in particular, does not degrade the performance of the engine(s) of said aircraft.

Another object of the invention is to propose a heating system that is equipped with such a heat exchange arrangement and that is designed for a rotary-wing aircraft.

The invention provides a heat exchange arrangement comprising an annular heat exchanger and a pipe. The annular heat exchanger, through which a first fluid flows, is positioned around said pipe, through which a second fluid flows. Said second fluid exits from the pipe via an opening in said pipe, and a third fluid flows through the heat exchanger from an inlet of the heat exchanger to an outlet of the heat exchanger.

This system is remarkable in that the heat exchanger further comprises a rear casing situated at the outlet of the heat exchanger and directing the third fluid towards the second fluid exiting via the opening in the pipe. The second fluid then generates a flow of the third fluid through the heat exchanger by the "Coanda effect", heat exchange taking place between the pipe, the third fluid, and the first fluid.

Firstly, this annular heat exchanger is a heat exchanger having separate fluids, i.e. the three fluids used by the heat exchanger flow through respective independent volumes and do not have any direct contact with one another. The first fluid flows inside an enclosure that is positioned partially inside the heat exchanger, while the third fluid passes through the heat exchanger from its inlet to its outlet. The second fluid flows through the pipe before exiting from said pipe via the opening therein.

For example, enclosures in frequent use in heat exchangers are known in which the first fluid can circulate and that are formed by one or more tubes snaking through the heat exchanger or by one or more sets of superposed plates. A heat exchange surface is thus constituted by this enclosure that makes heat exchange possible by convection between said first fluid and the third fluid passing through the heat exchanger.

In addition, the first and the third fluids may flow in the same direction: the heat exchanger may then be said to be a "co-current" heat exchanger; or else they may flow in opposite directions, in a "counter-current" heat exchanger. Preferably, the first and third fluids flow in opposite directions in order to improve the effectiveness of this heat exchange by convection.

The heat exchange arrangement of the invention is more particularly designed for a heating system for a rotary-wing aircraft. This heat exchange arrangement thus makes it possible to heat the cabin of the aircraft via the first fluid, the second fluid being constituted by the exhaust gas from at least one turbine engine of the aircraft, and the third fluid being formed by the ambient air surrounding the aircraft.

The shape of the rear casing directs the third fluid towards the second fluid exiting from the pipe. Advantageously, the shape of the rear casing makes it possible for the second fluid to generate the phenomenon of the third fluid being entrained by the "Coanda effect". The third fluid is entrained at the outlet of the heat exchanger by the flow of the second fluid exiting from the pipe, thereby generating a lower pressure inside the heat exchanger, and, as a result, generating suction at its inlet. The third fluid is thus caused to flow through the heat exchanger. The rear casing may extend beyond the opening in the pipe in order to direct the third fluid accurately towards the second fluid.

The "Coanda effect" is a fluid mechanics phenomenon. For example, when a fluid, regardless of whether it is in gas or liquid form, exits from any container via an orifice, a fraction of the fluid tends, at the time at which it exits, to flow along the outer periphery of the container.

The "Coanda effect" also applies in the field of gas flows, where it can result in very high entrainment effects entraining a first gas that is directed towards a flow of a second gas. The existence of such a "Coanda effect" depends on some important parameters, such as the flow speed of the second gas, its flow rate, or indeed the profile of the direction of the first gas relative to the flow of the second gas.

In order to enable the "Coanda effect" to take place in the heat exchange arrangement of the invention, the second and third fluids should be in gaseous form, the third fluid that corresponds to the above-mentioned first gas being entrained by the second fluid that corresponds to the second gas. In addition, the second fluid should have a flow speed through the pipe that is not zero and that is sufficiently high for the "Coanda effect" to take place.

Advantageously, in a rotary-wing aircraft equipped with one or more turbine engines, the exhaust gas exits from an exhaust pipe at a high speed, approximately in the range 40 meters per second (m/s) to 80 m/s depending on the engine speed, which is very favorable to producing the "Coanda effect". In addition, the resulting entrainment of the ambient air constituting the third fluid advantageously enables the third fluid to flow through the heat exchanger independently of the speed at which the aircraft is advancing. Thus, the third fluid is caused to flow through the heat exchanger regardless of the stage of flight of the rotary-wing aircraft, including during hovering, vertical, or indeed sideways flights.

In addition, the shape of the rear casing must be defined with care in order to direct the second fluid appropriately so that the "Coanda effect" occurs. In particular, this rear casing must be in contact with a peripheral portion of the flow of the second fluid at the outlet of the pipe. This rear casing must therefore extend beyond the pipe, and may present a convergent shape in order to bring the third fluid into contact with the second fluid. A mixing zone then appears in which the second fluid and the third fluid mix.

This flow of the third fluid through the heat exchanger thus facilitates heat exchange by convection between the third fluid and the first fluid, via the heat exchange surface constituted by the surface of the enclosure inside which the first fluid circulates. This first fluid can be caused to circulate by circulator means, such as a pump or a turbine, situated in the enclosure. The circulator means are preferably positioned outside the heat exchange arrangement of the invention.

Similarly, since the second fluid flows through the pipe around which the heat exchanger is positioned, heat exchange by convection between the pipe and the third fluid can take place via the heat exchange surface constituted by the surface of said pipe.

In addition, the surface of the pipe may also transfer a fraction of its heat by radiation. Heat exchange by radiation can take place between the pipe and the first fluid flowing through the heat exchanger. Similarly heat exchange by radiation can take place between the pipe and the third fluid.

However, in order to receive the heat transferred by radiation, a fluid must have a non-zero coefficient of absorption. In most applications of the heat exchange arrangement of the invention, and in particular in an application to heating the cabin of a rotary-wing aircraft, the third fluid is air and is thus transparent. In which case, the third fluid cannot receive heat energy by radiation since its coefficient of absorption is zero.

Advantageously, by combining heat exchange by radiation and heat exchange by convection, the annular heat exchanger of the heat exchange arrangement of the invention can have a large heat exchange capacity.

For example, and as explained below, in a rotary-wing aircraft, the exhaust gas from a turbine engine flows through the exhaust pipe at a high temperature, of about 700° C. As a result, the exhaust pipe also heats up and can transmit a fraction of the heat taken up by radiation around said pipe, in particular to the annular heat exchanger situated around said exhaust pipe.

As a result, heat exchange takes place firstly by radiation between the pipe and the first fluid, and secondly by convection between the pipe and the third fluid.

However, the heat exchange by radiation and the heat exchange by convection can be considerable when the temperature of the second fluid is high relative to the temperature of the first fluid and/or to the temperature of the third fluid.

This applies in particular for the use of the heat exchange arrangement of the invention in a heating system for heating a rotary-wing aircraft, it being possible for the exhaust gas from a turbine engine of said aircraft to be at a temperature that is very high relative to the temperature of ambient air. It can then be advantageous to limit this heat exchange in order to limit the temperature reached by the first fluid.

For this purpose, a thermal protection may be positioned at least partially between the pipe and the annular heat exchanger in order to limit the heat exchange obtained firstly by radiation between the pipe and the first fluid, and secondly by convection between the pipe and the third fluid. This thermal protection may, for example, comprise at least one heat screen.

In a first embodiment of the heat exchange arrangement of the invention, the thermal protection has thermal effectiveness that increases going from the inlet of the heat exchanger towards the outlet of the heat exchanger. The "thermal effectiveness" of a thermal protection is the capacity of said thermal protection to limit heat exchange between the two zones separated by said thermal protection.

For example, a single heat screen is positioned at the inlet of the annular heat exchanger while two heat screens that are identical to the first heat screen are positioned in the centre of the heat exchanger. Similarly, three heat screens that are identical to the first heat screen are positioned in the vicinity of the outlet of the heat exchanger.

This variation in the thermal effectiveness of the thermal protection may also be obtained by varying the thickness of the thermal protection as a function of the position of said thermal protection in the annular heat exchanger. More precisely, for this first embodiment, the thermal protection may be formed by a single heat screen having thickness that increases going from the inlet of the annular heat exchanger to the outlet thereof.

Such a heat screen may be constituted by a material of the metal foam type, made of steel or of copper, or by concentric cylindrical plates or else by a honeycomb structure, which plates or structure are, for example, made of stainless steel, of titanium, or of graphite materials.

In a heating system designed for a rotary-wing aircraft and including a heat exchange arrangement having its annular heat exchanger positioned around an exhaust pipe, the temperature of the third fluid constituted by ambient air entering the heat exchanger is substantially equal to the ambient temperature.

At the inlet of the heat exchanger, this third fluid does not heat the first fluid significantly. The heat exchange is then obtained essentially firstly by radiation between the pipe and the first fluid and secondly by convection between the pipe and the third fluid in an inlet zone of the heat exchanger. This inlet zone is formed by a first zone situated inside the heat exchanger and immediately after the inlet of the heat exchanger in the direction of flow of the third fluid. Similarly, an outlet zone is formed by a second zone situated inside the heat exchanger and immediately before the outlet of the heat exchanger.

In a central zone of the heat exchanger that is situated between the inlet zone and the outlet zone, the third fluid has been heated by convection in the inlet zone and can then heat the first fluid by convection. Therefore, the heat exchange by radiation is reduced by increasing the thermal effectiveness of the thermal protection. In the outlet zone, since the third fluid has been further heated in the central zone, the fraction of the heat exchange by convection between the first fluid and the third fluid becomes increasingly large. In addition, the heat exchange between the pipe and firstly the first fluid by radiation and secondly the third fluid by convection is further reduced by the increase in the thermal effectiveness of the thermal protection.

Thus, in this first embodiment of the heat exchange arrangement of the invention, the heat exchange is essentially obtained firstly by radiation between the pipe and the first fluid and secondly by convection between the pipe and the third fluid in the inlet zone of the heat exchanger, the temperature-reducing capacity of the thermal protection being low. Then, at the central zone and at the outlet zone of the heat exchanger, the heat exchange is obtained firstly by radiation between the pipe and the first fluid and secondly by convection between the pipe and the third fluid and between the third fluid and the first fluid, the temperature-reducing capacity of the thermal protection increasing progressively.

In a second embodiment of the heat exchange arrangement of the invention, the heat exchanger is provided with a front casing situated at the inlet of the heat exchanger and defining the inlet zone. In the front zone of the heat exchanger, the heat exchange is obtained only by convection between the pipe and the third fluid, the first fluid not flowing through this front zone. No thermal protection is positioned in this front zone so that the heat exchange by radiation is at a maximum between the pipe and the third fluid.

Then, a thermal protection is arranged beyond the front zone of the heat exchanger in the central and outlet zones of the exchanger, through which the first fluid flows. This thermal protection has a thermal effectiveness that then decreases to the outlet of the heat exchanger. Thus, in the central zone of the heat exchanger, where the flow of the first fluid starts, the heat exchange is obtained essentially by convection between the third fluid and the first fluid, the majority of the heat exchange coming from the pipe, be it by radiation or by convection, being stopped by the thermal protection. Then, in the outlet zone of the heat exchanger, for example, the heat exchange by convection between the third fluid and the first fluid becomes less effective, the heat exchange between the pipe and the third fluid being low. Advantageously, the heat exchange coming from the pipe, in particular by radiation with the first fluid, increases progressively in order to compensate for this reduction in heat exchange by convection between the third fluid and the first fluid, the thermal effectiveness of the thermal protection decreasing progressively.

In this second embodiment of the heat exchange arrangement of the invention, the heat exchange is obtained only by convection between the pipe and the third fluid in the inlet zone of the heat exchanger. Then, in the central zone, the heat exchange is obtained in part by convection between the third fluid and the first fluid and in part by radiation between the pipe and the first fluid. Then, the fraction of the heat exchange coming from the pipe, be it by radiation or by convection, increases progressively and proportionally to the reduction of the thermal effectiveness of the thermal protection while the fraction of heat exchange by convection between the third fluid and the first fluid decreases.

The present invention also provides a heating system for a vehicle, the vehicle being provided with a cabin and with at least one engine, the heating system including piping through which a heat transfer fluid circulates, at least one heater element through which said heat transfer fluid circulates in order to heat the cabin, and at least one circulator means for driving circulation of said heat transfer fluid.

This heating system includes a heat exchange arrangement as mentioned above, thus making it possible to heat the heat transfer fluid, this heat transfer fluid being the first fluid flowing through the annular heat exchanger of said heat exchange arrangement.

This heating system is particularly suitable for rotary-wing aircraft having at least one turbine engine. The annular heat exchanger is then positioned around at least one exhaust nozzle of a turbine engine and the second fluid is constituted by the exhaust gas from said turbine engine.

Advantageously, this heating system does not degrade the performance of the turbine engine(s) of the aircraft that it equips.

This heating system does not tap any of the compressed air exiting from the compressor of the turbine engine.

In addition, since no element disrupts the flow rate of the exhaust gas, no additional head loss is generated by the annular heat exchanger of this heating system in the flow of the exhaust gas.

In addition, no element is in direct contact with the exhaust gas and therefore no element is subjected to the high temperature of said exhaust gas. No element therefore requires high-grade mechanical characteristics, thereby making it possible to reduce the cost and the weight of the heating system.

In addition, it is important to avoid a flow of high-temperature fluid along the fuselage of the aircraft. The first fluid is then chosen so as to have a circulation temperature that is moderate and sufficient to enable the cabin of the aircraft to be heated. The first fluid is, for example, a liquid heat transfer fluid having a circulation temperature of approximately in the range 80° C. to 100° C.

In addition, the thermal protection limiting the heat exchange by radiation makes it possible to limit the temperature of the internal portion of the heat exchanger, e.g. to a temperature of approximately in the range 100° C. to 120° C. in such a manner that it can heat the first fluid to a temperature of approximately in the range 80° C. to 100° C.

It is thus advantageous for it to be possible to limit the temperature of the internal portion of the heat exchanger to a value compatible with the first fluid, in particular so as to stop the circulation when there is no need to heat the cabin of the aircraft. This limitation is achieved by the presence of the thermal protection combined with the flow of air generated by the "Coanda effect". This temperature of the internal portion of the heat exchanger is, for example, limited to about 250° C.

Conversely, it can be necessary to continue to cause the first fluid to circulate with a minimum flow rate, including when there is no need to heat the cabin of the aircraft, in order to prevent its temperature from being too high. It is then necessary to provide an additional device for removing a fraction of the heat from the first fluid to the outside environment, e.g. via another heat exchanger, or else to find some other use for this available heat.

BRIEF DESCRIPTION OF THE SEVERAL VIEWS OF THE DRAWINGS

The invention and its advantages appear in greater detail from the following description of embodiments given by way of illustration with reference to the accompanying figures, in which.

Elements present in more than one of the figures are given the same references in each of them.

DETAILED DESCRIPTION OF THE INVENTION

Figure 1:
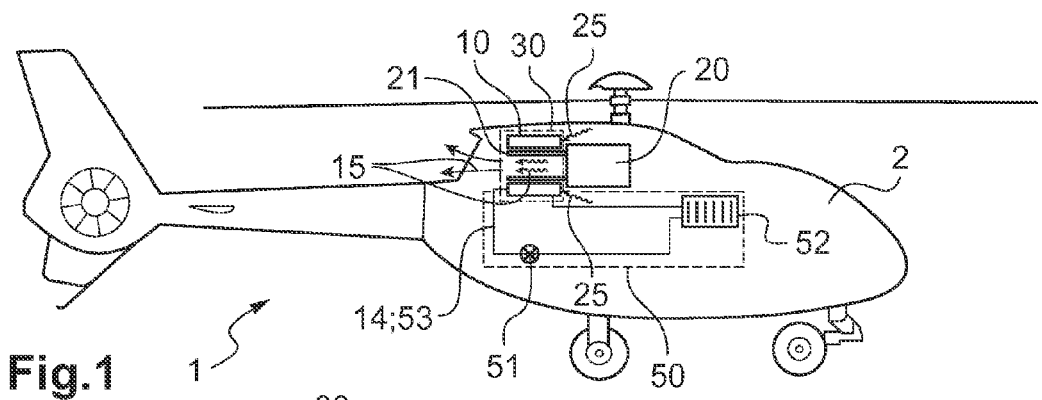
FIG. 1 shows a rotary-wing aircraft equipped with a heating system for heating its cabin.

FIG. 1 shows a rotary-wing aircraft 1 provided, in particular, with a cabin 2, with a turbine engine 20, with an exhaust pipe 21, and with a heating system 50. This heating system 50 includes a first fluid 14 flowing through piping 53, circulation means 51 for causing said first fluid 14 to circulate, a heater element 52, and a heat exchange arrangement 30 provided with an annular heat exchanger 10 and with an exhaust pipe 21. This first fluid 14 is a heat transfer fluid that is heated in the annular heat exchanger 10 and that can thus heat the cabin 2 of the aircraft 1 via the heater element 52.

Figure 2:
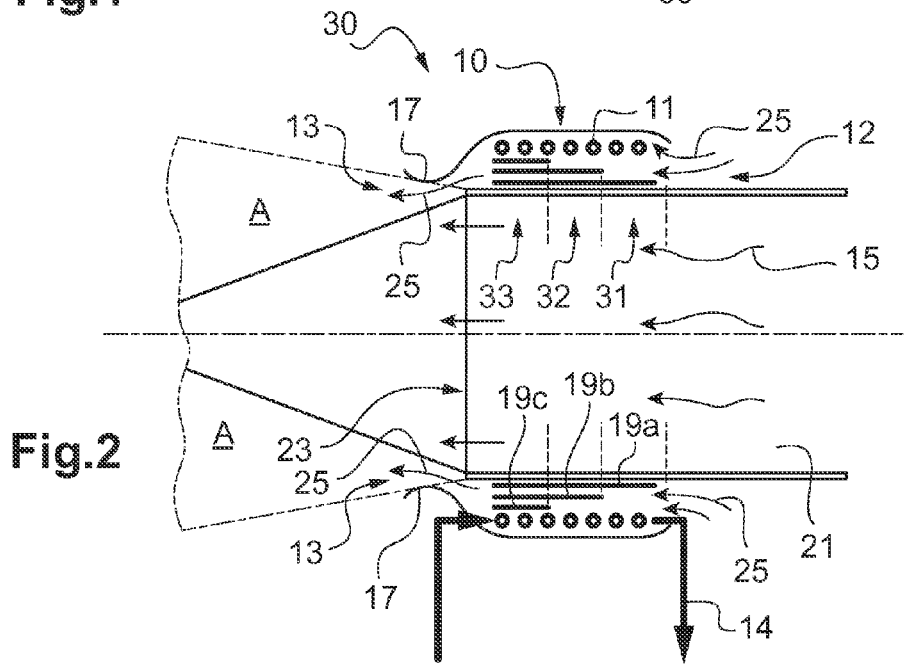
FIG. 2 shows a first embodiment of a heat exchange arrangement equipping said heating system.
Figure 3:
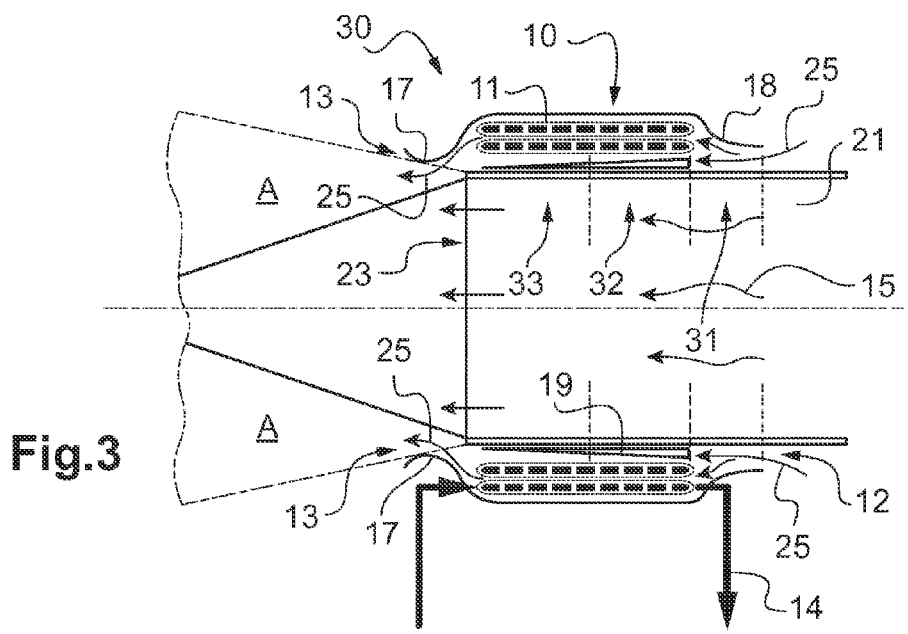
FIG. 3 shows a second embodiment of a heat exchange arrangement equipping said heating system.

FIGS. 2 and 3 show two embodiments of this heat exchange arrangement 30.

Regardless of the embodiment, the annular heat exchange element 10 is positioned around the exhaust pipe 21 of the aircraft 1, through which pipe a second fluid 15 formed by the exhaust gas from the turbine engine 20 flows. In general, this exhaust pipe 21 is substantially cylindrical in shape.

The annular heat exchanger 10 has an enclosure 11 connected to the piping 53 and through which the first fluid 14 circulates, and it also has an inlet 12 and an outlet 13, via which inlet and outlet a third fluid 25 enters and exits from this annular heat exchanger 10. Thus, the outside surface of the enclosure 11 constitutes a heat exchange surface for heat exchange between the first fluid 14 and the third fluid 25. Therefore, heat exchange by convection can, inter alia, take place between the first fluid 14 and the third fluid 25. This third fluid 25 is the ambient air surrounding the aircraft 1.

The annular heat exchanger 10 also has a rear casing 17 directing the ambient air 25 exiting via the outlet 13 of the heat exchanger 10 towards the exhaust gas 15 exiting from the opening 23 in the pipe 21. The shape of this rear casing 17 enables the exhaust gas 15 to generate the phenomenon whereby ambient air 25 is entrained by the "Coanda effect". Ambient air 25 is entrained at the outlet 13 of the heat exchanger 10 by the flow of the exhaust gas 15 exiting from the pipe 21, generating lower pressure inside the heat exchanger 10, thereby causing ambient air 25 to be sucked in at the inlet 12 of the heat exchanger 10. Thus, the ambient air 25 is caused to flow through the heat exchanger 10.

The rear casing 17 must be in contact with a peripheral portion of the flow of the exhaust gas 15 exiting from the pipe 21, as shown in FIGS. 2 and 3. Said rear casing 17 then extends beyond the opening 23 in the pipe 21 in order to direct the ambient air 25 accurately towards the exhaust gas 15. The rear casing 17 has a convergent shape so as to bring the ambient air 25 into contact with the exhaust gas 15. A mixing zone A in which the ambient air 25 and the exhaust gas 15 mix then appears.

In addition, the exhaust gas 15 flowing through the pipe 21 is very hot, and of the order of 700° C., and it exits from the pipe 21 via the opening 23. The pipe 21 is also hot. Therefore, heat exchange can take place firstly by radiation between the pipe 21 and the first fluid 14 via the heat exchange surface of the enclosure 11, and secondly by convection between the pipe 21 and the third fluid 25.

However, the annular heat exchanger 10 equips a heating system 50, and the first fluid 14 feeds a heater element 52. The temperature of said first fluid 14 must therefore not be excessive, firstly so as not to overheat the cabin 2 of the aircraft 1 and secondly so that the temperature of the piping 53 through which the first fluid 14 circulates is not excessive. For this purpose, the annular heat exchanger 10 has a thermal protection positioned at least partially between the pipe 21 and the annular heat exchanger 10. The amount of heat exchanged with the pipe 21, be it by radiation or by convection, can thus be limited. Said thermal protection comprises at least one heat screen 19 and it may be constituted by a material of the metal foam type, e.g. steel or copper foam, or by concentric cylindrical plates or else by a honeycomb structure, which plates or structure are, for example, made of stainless steel, of titanium, or of graphite materials.

In addition, the annular heat exchanger 10 has three zones 31, 32, 33. An inlet zone 31 is situated immediately after the inlet 12 of the heat exchanger 10 in the direction of flow of the ambient air 25 through the exchanger 10, and an outlet zone 33 is situated immediately before the outlet 13 of the heat exchanger 10. A central zone 32 is situated between the inlet zone 31 and the outlet zone 33.

In a first embodiment of the heat exchange arrangement 30 shown in FIG. 2, the thermal protection of the annular heat exchanger 10 is formed by three heat screens 19a, 19b, 19c. A first heat screen 19a covers all three zones 31, 32, 33, while a second heat screen 19b covers only the central zone 32 and the outlet zone 33. A third heat screen 19c covers only the outlet zone 33. These three heat screens 19a, 19b, 19c have the same thermal effectiveness by, for example, being made of the same material and having the same thickness. In addition, the enclosure 11 inside which the first fluid 14 circulates is situated in all three zones 31, 32, 33. This enclosure 11 is of tubular shape and is constituted by one or more tubes snaking through the annular heat exchanger 10.

Thus, in the inlet zone 31, the heat exchanger 10 has a single heat screen 19a. Therefore, the amount of heat exchanged with the pipe 21 is large, making it possible firstly, by radiation, to heat the first fluid 14 circulating inside the enclosure 11, and secondly, by convection, to heat the ambient air 25 flowing through the heat exchanger 10. However, the ambient air 25 that has just entered the heat exchanger 10 has a temperature close to the temperature outside the aircraft 1 and therefore does not heat the first fluid 14 by convection.

Then, in the central zone 32, the heat exchanger 10 has two heat screens 19a, 19b. Therefore, the amount of heat exchanged with the pipe 21 is lower than in the inlet zone 31. However, it makes it possible to heat the first fluid 14 by radiation and to heat the ambient air 25 flowing through the heat exchanger 10 by convection. In addition, since the ambient air 25 has been heated by radiation in the inlet zone 31, it can heat the first fluid 14 by convection.

Finally, in the outlet zone 33, the heat exchanger 10 has three heat screens 19a, 19b, 19c. As a result, the amount of heat exchanged with the pipe 21 is further reduced relative to the amount of heat exchanged in the inlet zone 31 and in the central zone 32. However, it can heat the first fluid 14 slightly, by radiation, and it can heat the ambient air 25 flowing through the heat exchanger 10 slightly, by convection, the first fluid 14 essentially being heated by convection from the ambient air 25.

Thus, the thermal protection of the annular heat exchanger 10 in this first embodiment has thermal effectiveness that increases going from the inlet 12 of the heat exchanger 10 towards its outlet 13.

In a second embodiment of the heat exchange arrangement 30 shown in FIG. 3, no protection is present in the inlet zone 31, while the thermal protection of the annular heat exchanger 10 is formed by a single heat screen 19 in the central zone 32 and in the outlet zone 33. In addition, the thickness of said heat screen 19 decreases going from the central zone 32 towards the outlet zone 33, the enclosure 11 inside which the first fluid 14 circulates being situated only in the central zone 32 and in the outlet zone 33. This enclosure 11 is constituted by one or more sets of superposed plates. In addition, a front casing 18 forms the inlet 12 of the heat exchanger 10 and said inlet zone 31.

Thus, in the inlet zone 31, only ambient air 25 flows. Heat exchange takes place by convection between the pipe 21 and the ambient air 25. In addition, this heat exchange by convection is at its maximum since no thermal protection is present in this inlet zone 31.

Then, in the central zone 32, the first fluid 14 circulates inside the enclosure 11 and the ambient air 25 heated in the inlet zone 32 flows through the heat exchanger 10. As a result, the heat exchange is essentially obtained by convection between the ambient air 25 heated in the inlet zone 31 and the first fluid 14, the majority of the heat exchanged with the pipe 21 being stopped by the heat screen 19 which is of large thickness in the central zone 32. However, heat exchange nevertheless takes place firstly by radiation between the pipe 21 and the first fluid 14, and secondly by convection between the pipe 21 and the ambient air 25.

Finally, in the outlet zone 33, the heat exchange by convection between the ambient air 25 and the first fluid 14 decreases. The heat taken up by and stored in the ambient air 25 in the inlet zone 31 has, to a large extent, been transmitted to the first fluid 14 in the central zone 32. However, since the thickness of the heat screen 19 is smaller in this outlet zone 33, the amount of heat exchanged with the pipe 21 increases considerably. Thus, in this outlet zone 33, a majority of the heat exchange takes place with the pipe 21, making it possible firstly to heat the first fluid 14 by radiation and secondly to heat the ambient air 25 by convection, and also, a minority of the heat exchange takes place by convection between the ambient air 25 and the first fluid 14.

In addition, regardless of the embodiment of the heat exchange arrangement 30 of the invention, the thermal protection limiting the heat exchange of the pipe 21 in the heat exchanger 10 makes it possible to limit the temperature of the first fluid 14 to a temperature of in the range 80° C. to 100° C. while said first fluid is circulating through the piping 53 during heating of the cabin 2 of the aircraft 1, the internal portion of said heat exchanger 10 having a temperature of approximately in the range 100° C. to 120° C.

Conversely, when there is no need to heat the cabin 2 of the aircraft 1, the circulation of the first fluid 14 can be stopped, or else its flow rate can be reduced, and the temperature of the internal portion of the heat exchanger 10 is then limited, for example, to about 250° C., by means of the presence of the thermal protection. The temperature of the first fluid 14 can then be greater than its operating temperature which lies approximately in the range 80° C. to 100° C. as mentioned above, without going beyond the maximum temperature acceptable for said first fluid 14.

Naturally, the present invention is capable of numerous variations concerning its implementation. Although several embodiments are described, it should readily be understood that it is not conceivable to identify exhaustively all possible embodiments. It is naturally possible to envisage replacing any of the means described by equivalent means without going beyond the ambit of the present invention. In particular, the number of heat screens 19 present in the two embodiments that are described is non-limiting, it being possible for said number of heat screens 19 to be different depending on the embodiment of the invention.

What is claimed is:

1. A heat exchange arrangement comprising an annular heat exchanger and a pipe, said heat exchanger, through which a first fluid flows, being positioned around said pipe, through which a second fluid flows, said second fluid exiting from said pipe via an opening in said pipe, and a third fluid flowing through said heat exchanger from an inlet of said heat exchanger to an outlet of said heat exchanger;
    wherein said heat exchanger further comprises a rear casing situated at said outlet and directing said third fluid towards said second fluid exiting via said opening, the second fluid then generating a flow of said third fluid through said heat exchanger by a "Coanda effect", heat exchange taking place between said pipe, said third fluid, and said first fluid.

2. A heat exchange arrangement according to claim 1, wherein said heat exchange is constituted at least by heat exchange by convection between said pipe and said third fluid.

3. A heat exchange arrangement according to claim 1, wherein said heat exchange is constituted at least by heat exchange by radiation between said pipe and said first fluid.

4. A heat exchange arrangement according to claim 1, wherein said heat exchange is constituted at least by heat exchange by convection between said third fluid and said first fluid.

5. A heat exchange arrangement according to claim 1, wherein said heat exchanger further comprises a thermal protection positioned at least partially between said pipe and said heat exchanger in order to limit said heat exchange with said pipe.

6. A heat exchange arrangement according to claim 5, wherein said thermal protection is constituted by at least one heat screen formed of one or more elements chosen from a list comprising a material of a metal foam type, concentric cylindrical plates, and a honeycomb structure.

7. A heat exchange arrangement according to claim 5, wherein said thermal protection has thermal effectiveness that increases going from said inlet towards said outlet, said heat exchange being essentially obtained firstly by radiation between said pipe and said first fluid, and secondly by convection between said pipe and said third fluid in an inlet zone of said heat exchanger while, beyond said inlet zone, said heat exchange is obtained by radiation between said pipe and said first fluid, by convection between said pipe and said third fluid, and by convection between said third fluid and said first fluid, said inlet zone being formed by a zone situated inside said heat exchanger immediately after said inlet in a direction of flow of said third fluid through said heat exchanger.

8. A heat exchange arrangement according to claim 1, wherein, with said heat exchanger being provided with a front casing in an inlet zone of said heat exchanger, the heat exchange in said inlet zone is obtained only by convection between said pipe and said third fluid, said inlet zone being formed by a zone situated inside said heat exchanger immediately after said inlet in the direction in which said third fluid flows through said heat exchanger, said first fluid not flowing through said inlet zone.

9. A heat exchange arrangement according to claim 8, wherein, with said heat exchanger being provided with a thermal protection positioned at least partially between said pipe and said heat exchanger, said thermal protection has thermal effectiveness that starts beyond said inlet zone and decreases going to said outlet, said heat exchange being obtained only by convection between said pipe and said third fluid in said inlet zone, and then beyond said inlet zone said heat exchange being obtained by radiation between said pipe and said first fluid, by convection between said pipe and said third fluid, and by convection between said third fluid and said first fluid.

10. A heat exchange arrangement according to claim 1, wherein said rear casing has a convergent shape that is in contact with a peripheral portion of the flow of said second fluid exiting from the outlet of said pipe, and that extends beyond said pipe in order to bring said third fluid into contact with said second fluid.

11. A heat exchange arrangement according to claim 1, wherein said third fluid is ambient air.

12. A heat exchange arrangement according to claim 1, wherein said pipe is an exhaust pipe for discharging exhaust gas from an engine, and said second fluid is formed by said exhaust gas.

13. A heating system for heating a vehicle, said vehicle being provided with a cabin and with at least one engine, said heating system including at least one set of piping through which a heat transfer fluid circulates, circulator means for circulating said heat transfer fluid, and at least one heater element though which said heat transfer fluid circulates in order to heat said cabin, wherein said heating system includes a heat exchange arrangement according to claim 12, making it possible to heat said heat transfer fluid, said heat transfer fluid being said first fluid of said heat exchanger.

14. A heating system according to claim 13, wherein said vehicle is a rotary-wing aircraft, said engine is a turbine engine, and said pipe is constituted by at least one exhaust nozzle of at least one turbine engine.

* * * * *